United States Patent
Costabello et al.

(10) Patent No.: US 12,248,956 B2
(45) Date of Patent: Mar. 11, 2025

(54) UTILIZING MACHINE LEARNING MODELS FOR DATA-DRIVEN CUSTOMER SEGMENTATION

(71) Applicant: Accenture Global Solutions Limited, Dublin (IE)

(72) Inventors: Luca Costabello, Newbridge (IE); Sumit Pai, Dublin (IE); Fiona Brennan, Dublin (IE); Adrianna Janik, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 251 days.

(21) Appl. No.: 17/449,506

(22) Filed: Sep. 30, 2021

(65) Prior Publication Data

US 2022/0188850 A1    Jun. 16, 2022

Related U.S. Application Data

(60) Provisional application No. 63/199,234, filed on Dec. 15, 2020.

(51) Int. Cl.
*G06Q 30/0204* (2023.01)
*G06N 3/042* (2023.01)
(Continued)

(52) U.S. Cl.
CPC ......... *G06Q 30/0204* (2013.01); *G06N 3/042* (2023.01); *G06N 5/02* (2013.01); *G06Q 30/0255* (2013.01)

(58) Field of Classification Search
CPC ........... G06Q 30/0204; G06Q 30/0255; G06Q 30/0251; G06Q 30/0253; G06Q 30/0254;
(Continued)

(56) References Cited

U.S. PATENT DOCUMENTS 10,990,644 B2    4/2021    Homer et al.
2015/0332335 A1*  11/2015  Abraham ............... G06Q 50/01
                                              705/14.44
(Continued)

FOREIGN PATENT DOCUMENTS

WO    WO-2017093953 A1 *  6/2017  ........... G06F 16/906

OTHER PUBLICATIONS

Cho, Kyunghyun, et al. "On the properties of neural machine translation: Encoder-decoder approaches." arXiv preprint arXiv:1409.1259 (2014). (Year: 2014).*

(Continued)

*Primary Examiner* — Mehmet Yesildag
*Assistant Examiner* — Thomas Yih Ho
(74) *Attorney, Agent, or Firm* — Polsinelli PC

(57) ABSTRACT

A device may receive purchase data identifying purchases by users of user devices and identifying non-temporal data associated with the users, and may preprocess the purchase data to generate sequences of multivariate and multimodal symbols. The device may process the sequences of multivariate and multimodal symbols, with a long short-term memory based encoder-decoder model, to generate sequence embeddings, and may process the non-temporal data associated with the users, with a knowledge graph, to determine knowledge graph embeddings capturing the non-temporal data. The device may process the sequence embeddings and the knowledge graph embeddings, with a knowledge graph embedding model, to generate modified sequence embeddings, and may process the modified sequence embeddings, with a clustering model, to determine clusters of the users in relation to products or services purchased by the users. The device may perform one or more actions based on the clusters of the users.

20 Claims, 11 Drawing Sheets

(51) Int. Cl.
  *G06N 5/02* (2023.01)
  *G06Q 30/0251* (2023.01)
(58) Field of Classification Search
  CPC ........... G06Q 30/0269; G06Q 30/0271; G06N 3/042; G06N 5/02
  See application file for complete search history.

(56) References Cited

U.S. PATENT DOCUMENTS

| | | | | |
|---|---|---|---|---|
| 2016/0117736 | A1* | 4/2016 | Dasdan | G06Q 30/0269 705/14.66 |
| 2017/0140262 | A1* | 5/2017 | Wilson | H04L 67/04 |
| 2018/0300609 | A1* | 10/2018 | Krishnamurthy | G06N 3/044 |
| 2019/0205964 | A1* | 7/2019 | Onoro Rubio | G06N 3/084 |
| 2019/0244253 | A1* | 8/2019 | Vij | G06F 18/214 |
| 2019/0332946 | A1* | 10/2019 | Han | G06N 5/022 |
| 2019/0392330 | A1* | 12/2019 | Martineau | G06N 5/04 |
| 2020/0104395 | A1* | 4/2020 | Bhatia | G06F 16/9024 |
| 2020/0107072 | A1* | 4/2020 | Lomada | G06N 3/084 |

OTHER PUBLICATIONS

Xu, Jiacheng, et al. "Knowledge graph representation with jointly structural and textual encoding." arXiv preprint arXiv:1611.08661 (2016). (Year: 2016).*

Annervaz, K. M., Somnath Basu Roy Chowdhury, and Ambedkar Dukkipati. "Learning beyond datasets: Knowledge graph augmented neural networks for natural language processing." arXiv preprint arXiv:1802.05930 (2018). (Year: 2018).*

Wang, Heng, et al. "Incorporating graph attention mechanism into knowledge graph reasoning based on deep reinforcement learning." Proceedings of the 2019 conference on empirical methods in NLP and the 9th international joint conference on NLP (EMNLP-IJCLP). 2019 (Year: 2019).*

Wang, Xiang. Exploiting Cross-Channel Information for Personalized Recommendation. Diss. School of Computing National University of Singapore 2019 Supervisor: Professor Chua Examiners: Professor Lee Li Associate Professor Yap Chuan Professor Maarten de Rijke, University of Amsterdam. (Year: 2019).*

Chowdhury, Gourab, et al. "Neural Factorization for Offer Recommendation using Knowledge Graph Embeddings." eCOM@ SIGIR. 2019. (Year: 2019).*

Palmonari, Matteo, and Pasquale Minervini. "Knowledge graph embeddings and explainable AI." Knowledge Graphs for Explainable Artificial Intelligence: Foundations, Applications and Challenges 47 (2020): 49. (Year: 2020).*

Jiang, Zilong, and Shu Gao. "An intelligent recommendation approach for online advertising based on hybrid deep neural network and parallel computing." Cluster Computing 23.3 (2020): 1987-2000. (Year: 2020).*

Zhou, Lichun. "Product advertising recommendation in e-commerce based on deep learning and distributed expression." Electronic Commerce Research 20.2 (2020): 321-342. (Year: 2020).*

Costabello, Luca, et al. "Knowledge Graph Embeddings: From Theory to Practice." ECAI Digital 2020, Sep. 4, 2020 (accessed at https://kge-tutorial-ecai2020.github.io/ on May 27, 2024). (Year: 2020).*

Alkhayrat et al., "A comparative dimensionality reduction study in telecom customer segmentation using deep learning and PCA," Journal of Big Data, vol. 7, Issue 9, 2020, 23 Pages.

Wu et al., "An Empirical Study on Customer Segmentation by Purchase Behaviors Using a RFM Model and K-Means Algorithm," Mathematical Problems in Engineering, vol. 2020, Published Nov. 19, 2020, 7 Pages.

* cited by examiner

UTILIZING MACHINE LEARNING MODELS FOR DATA-DRIVEN CUSTOMER SEGMENTATION

CROSS-REFERENCE TO RELATED APPLICATION

This patent application claims priority to U.S. Provisional Patent Application No. 63/199,234, filed on Dec. 15, 2020, and entitled "UTILIZING MACHINE LEARNING MODELS FOR DATA-DRIVEN CUSTOMER SEGMENTATION FROM REVIEW SEQUENCES REPRESENTATION LEARNING AND INFLUENCE PROPAGATION." The disclosure of the prior application is considered part of and is incorporated by reference into this patent application.

BACKGROUND

Customer segmentation in the consumer goods industry is performed to identify cohorts or friends of similar customers, who can later be provided targeted advertisements based on their consumption patterns. For example, in the beverage industry, customer surveys and questionnaires are utilized to perform customer segmentation.

SUMMARY

Some implementations described herein relate to a method. The method may include receiving purchase data identifying purchases by users of user devices and identifying non-temporal data associated with the users, and preprocessing the purchase data to generate sequences of multivariate and multimodal symbols. The method may include processing the sequences of multivariate and multimodal symbols, with a long short-term memory based encoder-decoder model, to generate sequence embeddings, and processing the non-temporal data associated with the users, with a knowledge graph, to determine knowledge graph embeddings capturing the non-temporal data associated with the users. The method may include processing the sequence embeddings and the knowledge graph embeddings, with a knowledge graph embedding model, to generate modified sequence embeddings, and processing the modified sequence embeddings, with a clustering model, to determine clusters of the users in relation to products or services purchased by the users. The method may include performing one or more actions based on the clusters of the users.

Some implementations described herein relate to a device. The device may include one or more memories and one or more processors coupled to the one or more memories. The one or more processors may be configured to train, jointly, a long short-term memory based encoder-decoder model and a knowledge graph embedding model, and receive purchase data identifying purchases by users of user devices and identifying non-temporal data associated with the users. The one or more processors may be configured to preprocess the purchase data to generate sequences of multivariate and multimodal symbols, and process the sequences of multivariate and multimodal symbols, with the long short-term memory based encoder-decoder model, to generate sequence embeddings. The one or more processors may be configured to process the non-temporal data associated with the users, with a knowledge graph, to determine knowledge graph embeddings capturing the non-temporal data associated with the users, and process the sequence embeddings and the knowledge graph embeddings, with the knowledge graph embedding model, to generate modified sequence embeddings. The one or more processors may be configured to process the modified sequence embeddings, with a clustering model, to determine clusters of the users in relation to products or services purchased by the users, and perform one or more actions based on the clusters of the users.

Some implementations described herein relate to a non-transitory computer-readable medium that stores a set of instructions for a device. The set of instructions, when executed by one or more processors of the device, may cause the device to receive purchase data identifying purchases by users of user devices and identifying non-temporal data associated with the users, and preprocess the purchase data to generate temporal data associated with the users. The set of instructions, when executed by one or more processors of the device, may cause the device to process the temporal data associated with the users, with a long short-term memory based encoder-decoder model, to generate sequence embeddings, and process the non-temporal data associated with the users, with a knowledge graph, to determine knowledge graph embeddings capturing the non-temporal data associated with the users. The set of instructions, when executed by one or more processors of the device, may cause the device to process the sequence embeddings and the knowledge graph embeddings, with a knowledge graph embedding model, to generate modified sequence embeddings, and process the modified sequence embeddings, with a clustering model, to determine clusters of the users in relation to products or services purchased by the users. The set of instructions, when executed by one or more processors of the device, may cause the device to perform one or more actions based on the clusters of the users.

DETAILED DESCRIPTION

Figure 1A:
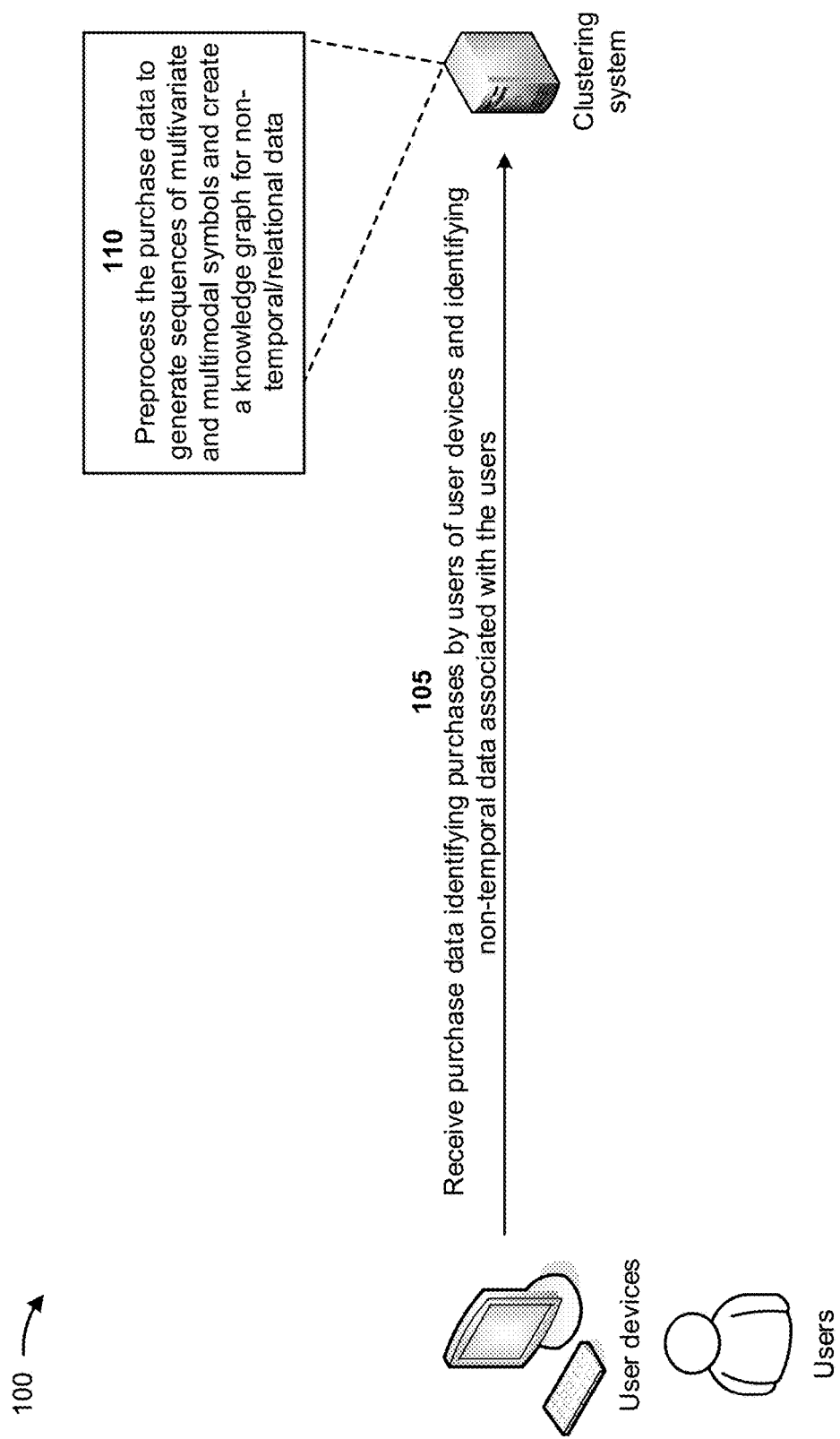
FIGS. 1A-1G are diagrams of an example implementation described herein.

The following detailed description of example implementations refers to the accompanying drawings. The same reference numbers in different drawings may identify the same or similar elements.

There is abundant consumption data (e.g., purchasing behavior data, online reviews of products, and/or the like) available that remains unused. The consumption data typically includes unlabeled consumption patterns of customers over years of consumption history along with other details (e.g., customer features), such as customer country of origin, birthdate, friendships with other customers (e.g., from social network data), product brands consumed, customer-generated product ratings and reviews, and/or the like. Such customer features are a combination of temporal features (e.g., brand consumed, product ratings, product reviews, and/or the like) and non-temporal features (e.g., birthdate, friendship, and/or the like). Friendship is considered a relational feature since friendship connects multiple customers. Customer segmentation is a difficult process due to this data complexity.

Current techniques for customer segmentation segment customers are based on only non-temporal features, based on reducing temporal features into aggregate features and using the aggregate features in combination with non-temporal features, based only on temporal features, based on temporal features and non-temporal features, and/or the like. Furthermore, current models used for customer segmentation are incapable of processing non-temporal features, are inefficient at learning temporal features, are inefficient at providing data representation and temporal feature modeling, and/or the like. Therefore, current techniques for customer segmentation consume computing resources (e.g., processing resources, memory resources, communication resources, and/or the like), networking resources, and/or the like associated with generating incorrect customer segments, generating and implementing ineffective product marketing campaigns based on the incorrect customer segments, generating and implementing ineffective targeted advertising based on the incorrect customer segments, discovering and correcting the incorrect customer segments, and/or the like.

Some implementations described herein relate to a clustering system that utilizes machine learning models for data-driven customer segmentation. For example, the clustering system may receive purchase data identifying purchases by users of user devices and identifying non-temporal data associated with the users, and may preprocess the purchase data to generate sequences of multivariate and multimodal symbols. The clustering system may process the sequences of multivariate and multimodal symbols, with a long short-term memory based encoder-decoder model, to generate sequence embeddings, and may process the non-temporal data associated with the users, with a knowledge graph, to determine knowledge graph embeddings capturing the non-temporal data associated with the users. The clustering system may process the sequence embeddings and the knowledge graph embeddings, with a knowledge graph embedding (KGE) model, to generate modified sequence embeddings, and may process the modified sequence embeddings, with a clustering model, to determine clusters of the users in relation to products or services purchased by the users. The clustering system may perform one or more actions based on the clusters of the users.

In this way, the clustering system utilizes machine learning models for data-driven customer segmentation. The clustering system may provide a machine-learning driven system to automatically cluster product customers that authored sequences of product reviews in an online community service. The clustering system may provide a mechanism for determining friendships among the product customers. Furthermore, the clustering system efficiently provides data representation and temporal feature modeling, with unlabeled data (e.g., without a need for human labels). This, in turn, conserves computing resources, networking resources, and/or the like that would otherwise have been consumed in generating incorrect customer segments, generating and implementing ineffective product marketing campaigns based on the incorrect customer segments, generating and implementing ineffective targeted advertising based on the incorrect customer segments, discovering and correcting the incorrect customer segments, and/or the like.

FIGS. 1A-1G are diagrams of an example 100 associated with utilizing machine learning models for data-driven customer segmentation. As shown in FIGS. 1A-1G, example 100 includes user devices associated with users and a clustering system. Each of the user devices may include a wireless communication device, a mobile phone, a user equipment, a laptop computer, a tablet computer, and/or the like associated with a user. The clustering system may include a system that utilizes machine learning models for data-driven customer segmentation. Further details of the user device and the clustering system are provided elsewhere herein.

As shown in FIG. 1A, and by reference number 105, the clustering system may receive purchase data identifying purchases by the users of the user devices and identifying non-temporal data associated with the users. The purchase data may include text input by the users via input components (e.g., keyboards) to the user devices, text that is spoken by the users and provided to the user devices via other input components (e.g., microphones or cameras with microphones), financial institution data identifying the purchases made by the users (e.g., via transaction cards, applications on the user devices, and/or the like), product and/or service data identifying products and/or services purchased by the users, product and/or service ratings and/or reviews generated by the users, and/or the like.

The knowledge graph may represent a collection of interlinked descriptions of entities (e.g., objects, events, or concepts) and may include a single relation type and a single class. The knowledge graph may include a graph dataset with directed, label edges that connect nodes representing concepts (e.g., people, products, services, companies, and/or the like). Two nodes of the knowledge graph may be connected by multiple edges with distinct labels. The knowledge graph may be utilized to model non-temporal data associated with the users. The non-temporal data may include data identifying friendships associated with the users, places of birth of the users, genders of the users, countries of origin of the users, and/or the like.

As further shown in FIG. 1A, and by reference number 110, the clustering system may preprocess the purchase data to generate sequences of multivariate and multimodal symbols and create a knowledge graph for non-temporal/relational data. In some implementations, the clustering system may process the purchase data, with a pretrained language model, to generate the sequences of multivariate and multimodal symbols. For example, the pretrained language model may utilize dimensions of the purchase data (e.g., brands, styles, scores, review text, and/or the like) to generate multivariate purchase sequences (e.g., [review_132, review_143, ..., review544], ... [review_21, review_435]) that include the dimensions of the purchase data. The pretrained language model may include a unigram model, an n-gram model, a bidirectional model, an exponential model, a neural network model, and/or the like.

Figure 1B:
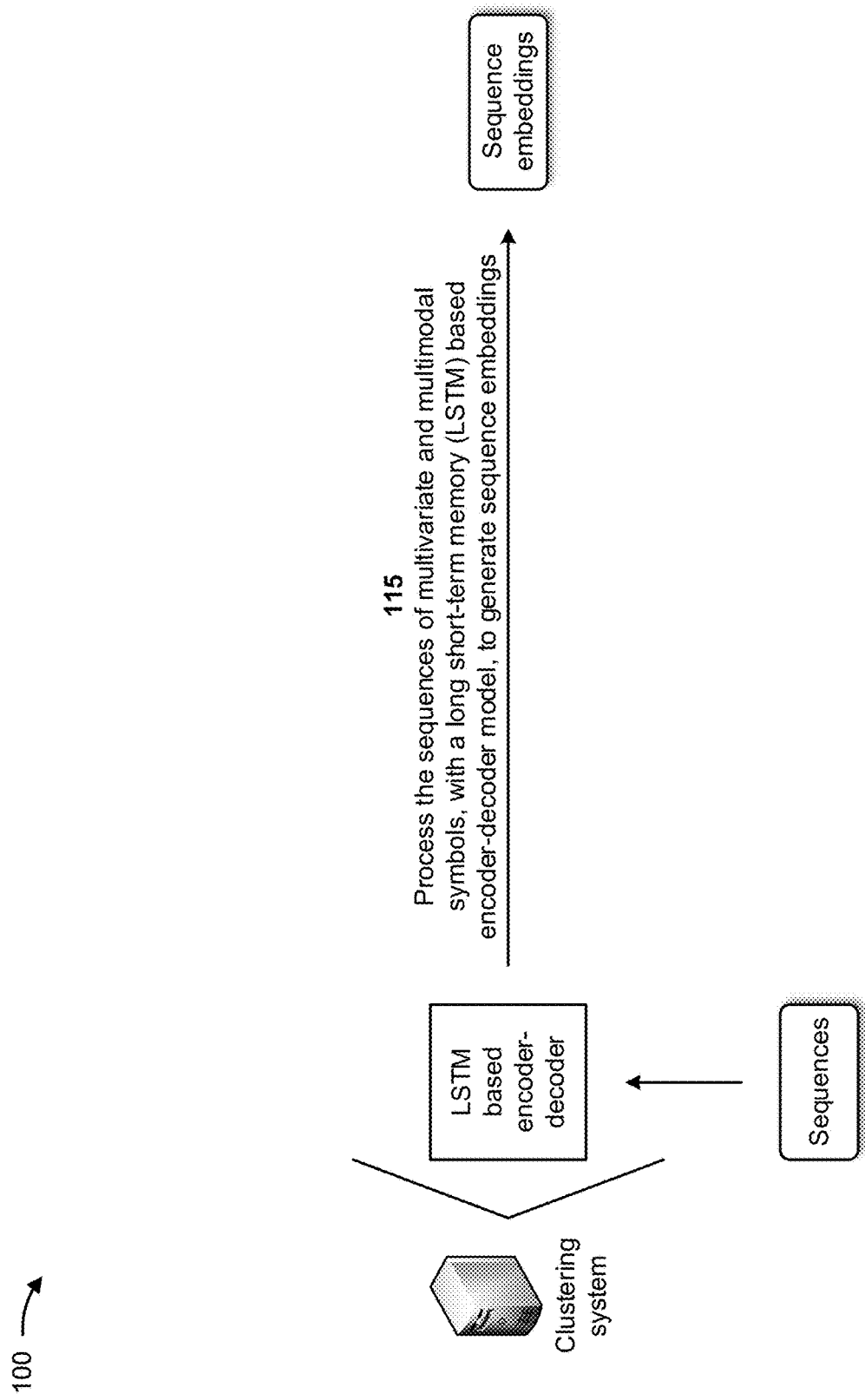

As shown in FIG. 1B, and by reference number 115, the clustering system may process the sequences of multivariate and multimodal symbols (e.g., temporal data), with a long short-term memory (LSTM) based encoder-decoder model, to generate sequence embeddings. One of the features of learning problems associated with sequential data includes a sequence embedding, which is a transformation of a sequence into a fixed length embedding. An embedding is an internal representation of concepts within a neural network and may include vectors (e.g., lists) of numbers that are learned by the neural network from input data during a training stage. The LSTM based encoder-decoder model may be trained as an autoencoder and latent embeddings of the LSTMs may be clustered using k-means clustering.

In some implementations, when processing the sequences of multivariate and multimodal symbols, with the LSTM based encoder-decoder model, to generate the sequence embeddings, the clustering system may initialize hidden vectors of the LSTM based encoder-decoder model using knowledge graph embeddings, and may update the hidden vectors with the temporal data associated with the users (e.g., the sequences of multivariate and multimodal symbols) to generate the sequence embeddings.

In some implementations, the sequences of multivariate and multimodal symbols (e.g., temporal data, such as a consumed brand, a style of the brand, a review score for the brand, a place of consumption, a time of consumption, and/or the like) may be provided to the encoder model at each time step and the encoder model may utilize the sequences to update an LSTM hidden vector. An LSTM hidden vector generated during the last time step may represent the sequence embeddings. The sequence embeddings may be provided to the decoder model. The decoder model may reconstruct an input sequence and may utilize an error in reconstruction as a loss to optimize weights of the LSTM based encoder-decoder model. The LSTM based encoder-decoder model may update the sequence embeddings by determining a derivative of the loss (e.g., until the loss converges), which, in turn, fine tunes the sequence embeddings.

Figure 1C:
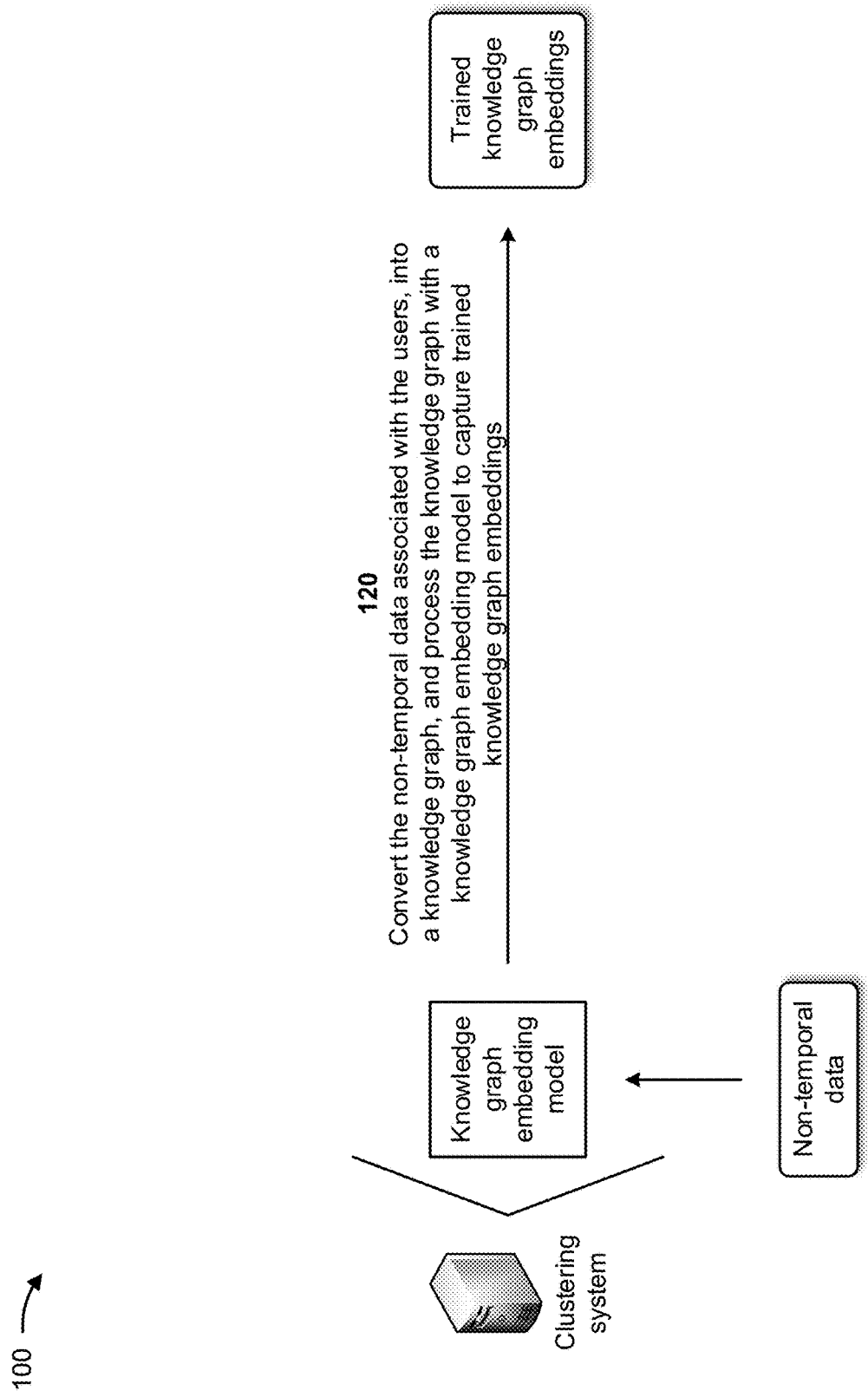

As shown in FIG. 1C, and by reference number 120, the clustering system may convert the non-temporal data associated with the users, into a knowledge graph, and process the knowledge graph with a knowledge graph embedding model to capture trained knowledge graph embeddings. A knowledge graph embedding represents entities and relations, in a knowledge graph, as elements in a continuous vector space so that missing links between nodes of the knowledge graph may be predicted. The clustering system may convert the non-temporal data associated with the users into a knowledge graph. In some implementations, the clustering system may process the knowledge graph, with a knowledge graph embedding model, to capture trained knowledge graph embeddings. The knowledge graph embedding model may include a neural network model that learns vector representations (e.g., the knowledge graph embeddings) of concepts from the knowledge graph to predict missing links between nodes of the knowledge graph.

Figure 1D:
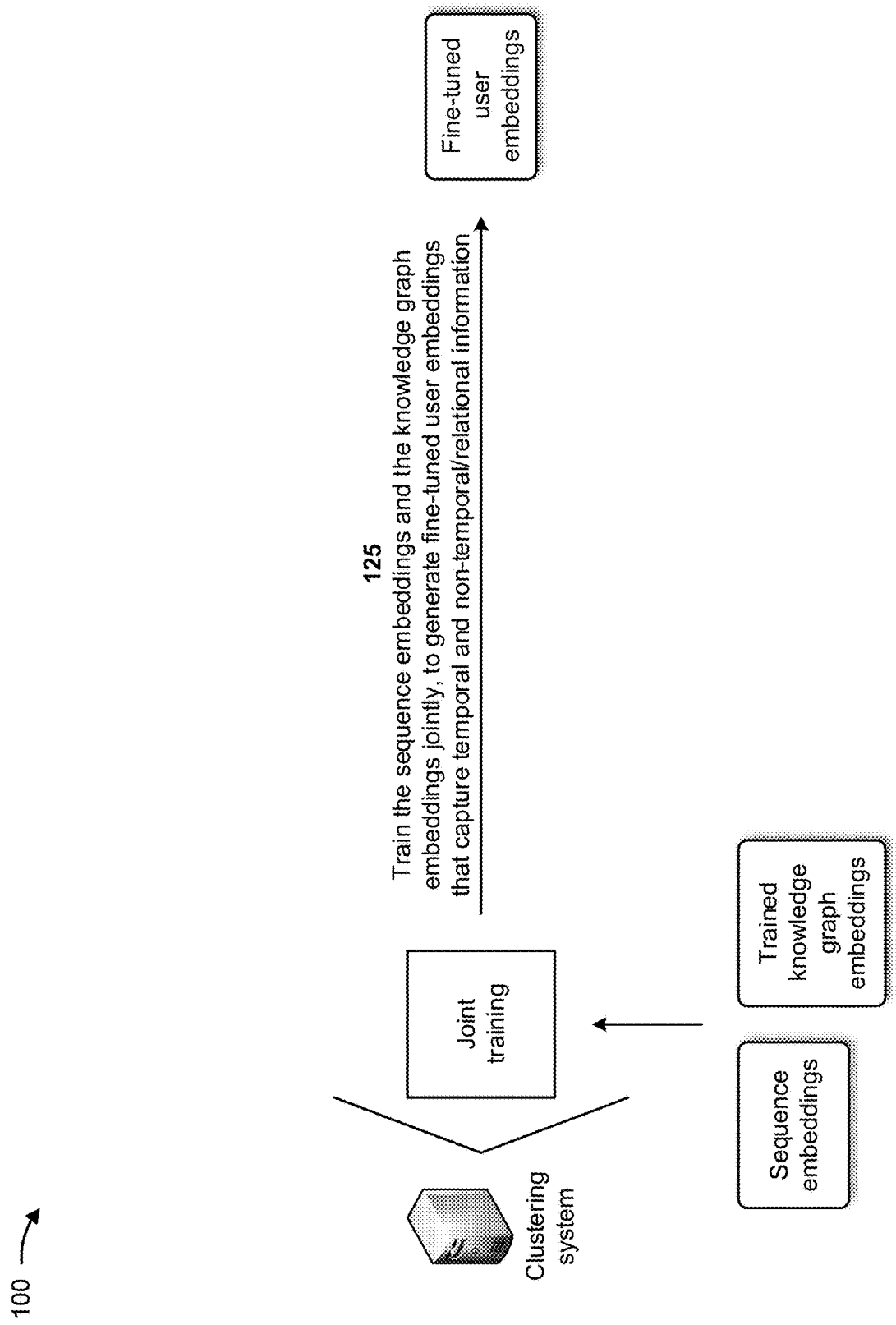

As shown in FIG. 1D, and by reference number 125, the clustering system may train the sequence embeddings and the knowledge graph embeddings jointly, to generate fine-tuned user embeddings that capture temporal and non-temporal/relational information. For example, the clustering system may utilize the sequence embeddings to initialize the knowledge graph embeddings. The knowledge graph embedding model may modify or fine-tune the sequence embeddings (e.g., to generate the fine-tuned user embeddings) by considering the non-temporal data provided by the knowledge graph embeddings. In some implementations, the clustering system may jointly train the sequence embeddings and the knowledge graph embeddings to generate the fine-tuned user embeddings that capture both temporal and non-temporal/relational information.

In some implementations, the clustering system may jointly train the LSTM based encoder-decoder model and the knowledge graph embedding model. For example, the clustering system may jointly train the LSTM based encoder-decoder model and the knowledge graph embedding model, prior to receiving the purchase data. In some implementations, when jointly training the LSTM based encoder-decoder model and the knowledge graph embedding model, the clustering system trains the knowledge graph embedding model, with historical non-temporal data, to generate historical knowledge graph embeddings, and trains the LSTM based encoder-decoder model, with the historical knowledge graph embeddings, to generate historical sequence embeddings. In some implementations, when jointly training the LSTM based encoder-decoder model and the knowledge graph embedding model, the clustering system trains the knowledge graph embedding model, with historical temporal data, to generate historical knowledge graph embeddings, and trains the LSTM based encoder-decoder model, with the historical knowledge graph embeddings, to generate historical sequence embeddings.

In some implementations, when jointly training the LSTM based encoder-decoder model and the knowledge graph embedding model, the clustering system optimizes knowledge graph embedding weights of the knowledge graph embedding model, prior to receiving the purchase data, and extracts historical knowledge graph embeddings based on optimizing the knowledge graph embedding weights of the knowledge embedding graph model. The clustering system may initialize a hidden vector of the LSTM based encoder-decoder model using the historical knowledge graph embeddings, and may optimize autoencoder weights of the LSTM based encoder-decoder model. The clustering system may update the historical knowledge graph embeddings based on the autoencoder weights and may generate trained knowledge graph embeddings.

In some implementations, when jointly training the LSTM based encoder-decoder model and the knowledge graph embedding model, the clustering system processes historical non-temporal data, with the knowledge graph model, to generate historical knowledge graph embeddings. The historical knowledge graph embeddings may be utilized as an initialization of the LSTM hidden vector. Historical temporal data may be provided to the encoder model at each time step and the encoder model may utilize the historical temporal data to update the LSTM hidden vector. An LSTM hidden vector generated during a last time step may represent a sequence embedding. The sequence embedding may be provided to the decoder model. The decoder model may reconstruct an input sequence and may utilize an error in reconstruction as a loss to optimize weights of the LSTM based encoder-decoder model. The LSTM based encoder-decoder model may update the historical knowledge graph embeddings by determining a derivative of the loss (e.g., until the loss converges), which, in turn, fine tunes the historical knowledge graph embeddings.

Figure 1E:
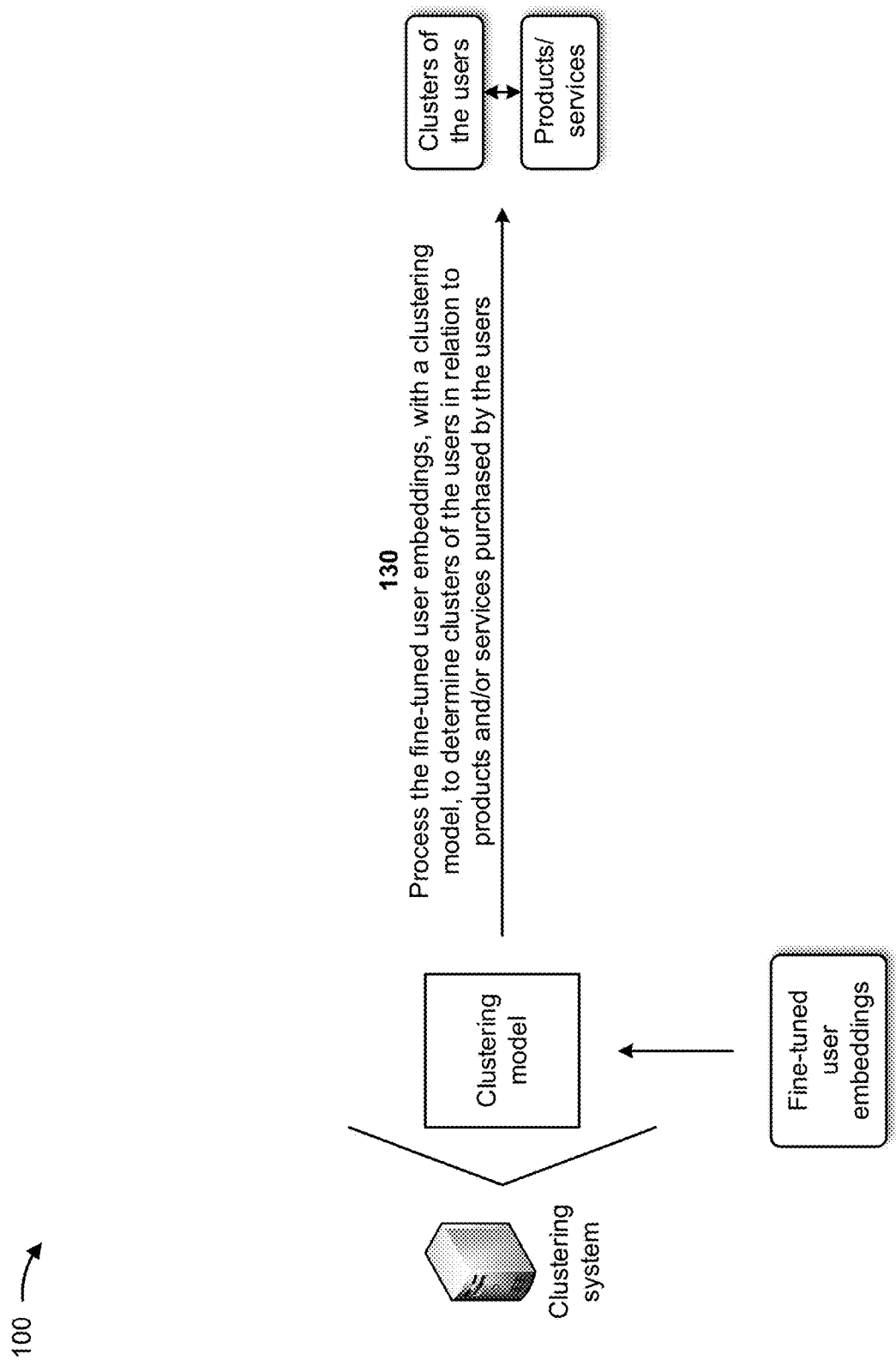

As shown in FIG. 1E, and by reference number 130, the clustering system may process the fine-tuned user embeddings, with a clustering model, to determine clusters of the users in relation to products and/or services purchased by the users. The clustering model may include a k-means clustering model, an agglomerative clustering model, a density-based spatial clustering of applications with noise (DB-SCAN) clustering model, and/or the like. In some implementations, the clustering model may identify the clusters of the users in relation to the products and/or services and may assign labels to the clusters. For example, for alcohol products, the clustering model may determine a cluster for casual drinkers, a cluster for beer geeks, a cluster for social drinkers, and/or the like. In this way, the clusters of the users may be more accurate than clusters identified by current techniques since the clustering system jointly trains the LSTM based encoder-decoder model and the knowledge graph embedding model and since the clustering system utilizes both temporal data and non-temporal data.

Figure 1F:
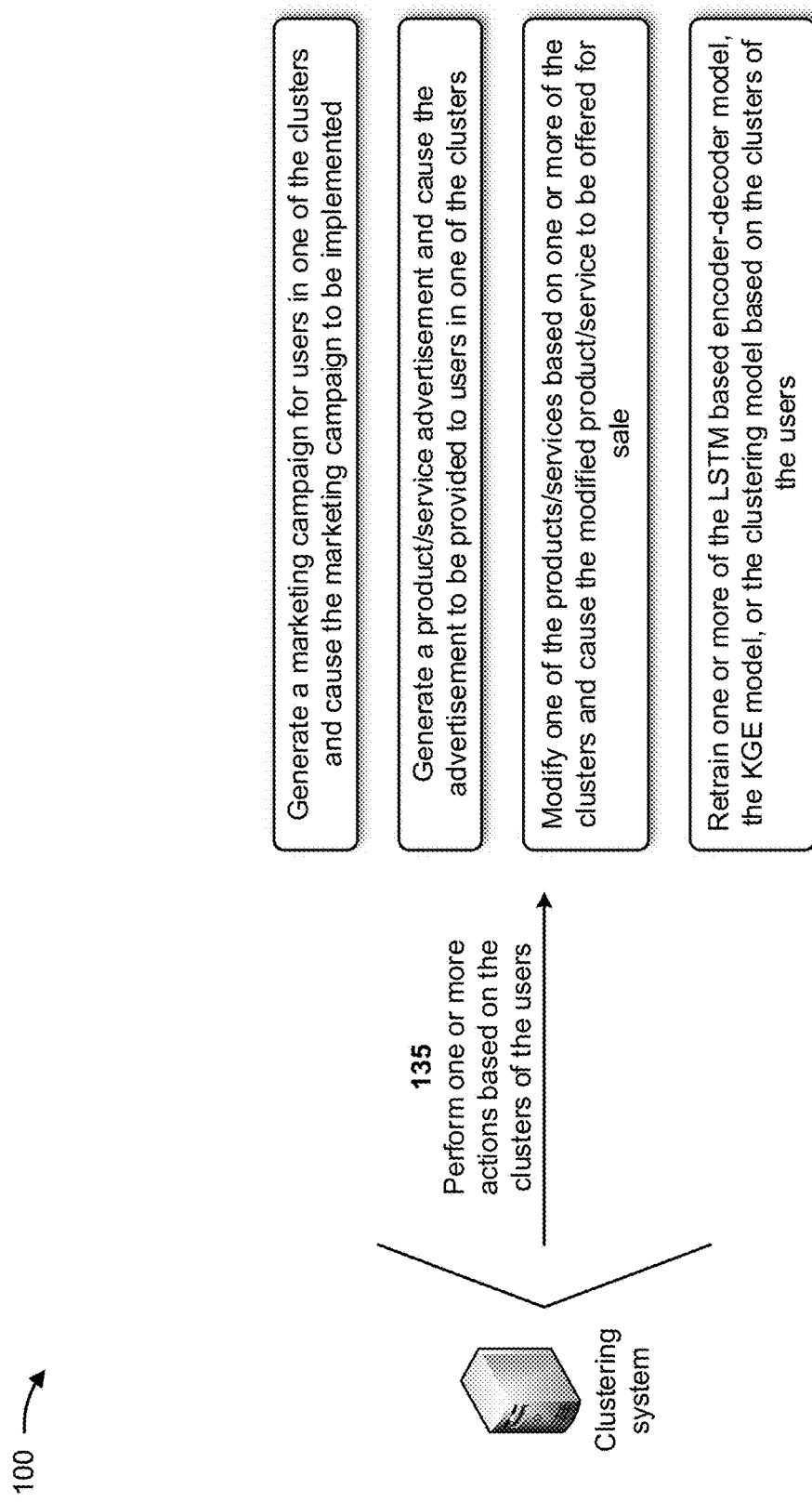

As shown in FIG. 1F, and by reference number 135, the clustering system may perform one or more actions based on the clusters of the users. In some implementations, the one or more actions include the clustering system generating a marketing campaign for users in one of the clusters and causing the marketing campaign to be implemented. For example, the clustering system may generate a marketing campaign to market a product (e.g., sneakers) to users (e.g., avid basketball players) in the one of the clusters. The clustering system may cause the marketing campaign to be implemented by causing marketing materials (e.g., promotions, print advertisements, media advertisements, and/or the like) to be generated for the product and provided to the users in the one of the clusters. In this way, the clustering system conserves computing resources, networking resources, and/or the like that would otherwise have been consumed in generating and implementing ineffective product marketing campaigns based on incorrect customer segments, discovering and correcting the incorrect customer segments, and/or the like.

In some implementations, the one or more actions include the clustering system generating a product or a service advertisement and causing the product or service advertisement to be provided to users in one of the clusters. For example, the clustering system may generate an advertisement to promote a service (e.g., home repair) to users (e.g., owners of older homes) in the one of the clusters. The clustering system may cause the advertisement to be provided to the users in the one of the clusters via a print advertisement (e.g., a mailer), a media advertisement (e.g., via a social media application), and/or the like. In this way, the clustering system conserves computing resources, networking resources, and/or the like that would otherwise have been consumed in generating incorrect customer segments, generating and implementing ineffective targeted advertising based on the incorrect customer segments, discovering and correcting the incorrect customer segments, and/or the like.

In some implementations, the one or more actions include the clustering system modifying one of the products or the services based on one or more of the clusters and causing the modified product or service to be offered for sale. For example, a cluster may indicate that users in the cluster like a product (e.g., a pair pants) but would prefer the pants to be a particular color that is not available (e.g., brown). Based on this information, the clustering system may cause the pants to be manufactured in a brown color and may cause the brown pants to be offered for sale (e.g., so that users in the cluster may purchase the desired brown pants). In this way, the clustering system conserves computing resources, networking resources, and/or the like that would otherwise have been consumed in generating incorrect customer segments, generating and implementing ineffective product marketing campaigns based on the incorrect customer segments, generating and implementing ineffective targeted advertising based on the incorrect customer segments, discovering and correcting the incorrect customer segments, and/or the like.

In some implementations, the one or more actions include the clustering system retraining one or more of the LSTM based encoder-decoder model, the knowledge graph embedding model, or the clustering model based on the clusters of the users. The clustering system may utilize the clusters of the users as additional training data for retraining the LSTM based encoder-decoder model, the knowledge graph embedding model, or the clustering model, thereby increasing the quantity of training data available for training the LSTM based encoder-decoder model, the knowledge graph embedding model, or the clustering model. Accordingly, the clustering system may conserve computing resources associated with identifying, obtaining, and/or generating historical data for training the LSTM based encoder-decoder model, the knowledge graph embedding model, or the clustering model relative to other systems for identifying, obtaining, and/or generating historical data for training machine learning models.

In this way, the clustering system utilizes machine learning models for data-driven customer segmentation. The clustering system may provide a machine-learning driven system to automatically cluster product customers that authored sequences of product reviews in an online community service. The clustering system may provide a mechanism for determining friendships among the product customers. Furthermore, the clustering system efficiently provides data representation and temporal feature modeling, with unlabeled data (e.g., without a need for human labels). This, in turn, conserves computing resources, networking resources, and/or the like that would otherwise have been consumed in generating incorrect customer segments, generating and implementing ineffective product marketing campaigns based on the incorrect customer segments, generating and implementing ineffective targeted advertising based on the incorrect customer segments, discovering and correcting the incorrect customer segments, and/or the like.

Figure 1G:
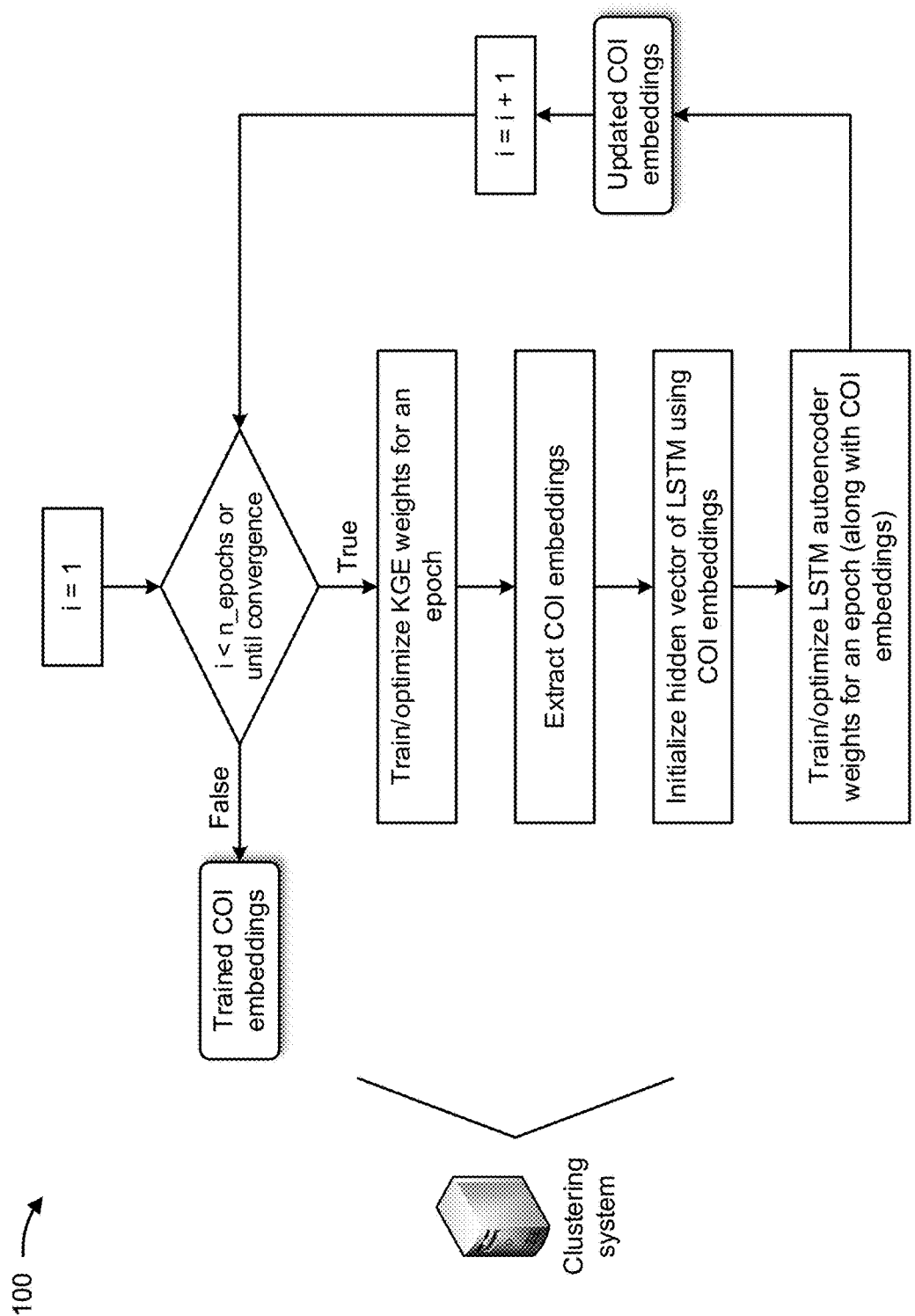

FIG. 1G is a diagram depicting a method of jointly training the LSTM based encoder-decoder model and the knowledge graph embedding model. For example, for each historical non-temporal data point (i), the clustering system may determine whether the data point (i) is less than a number (n) of epochs or until convergence. If the quantity of data points is greater than or equal to the number of epochs or convergence is attained (e.g., False for the decision block), the clustering system may output trained concept of interest (COI) embeddings (e.g., trained sequence embeddings). If the quantity of data points is less that the number of epochs or convergence is not attained (e.g., True for the decision block), the clustering system may train and/or optimize weights of the knowledge graph embedding model for an epoch, and may extract COI embeddings. The clustering system may initialize a hidden vector of the LSTM based encoder-decoder model using the COI embeddings, and may train and/or optimize autoencoder weights of the LSTM based encoder-decoder model for an epoch (e.g., along with the COI embeddings). The clustering system may update the COI embeddings based on the autoencoder weights, may increase the data point by a one (e.g., i=i+1), and may determine whether the increased data point is less than the number (n) of epochs or until convergence.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
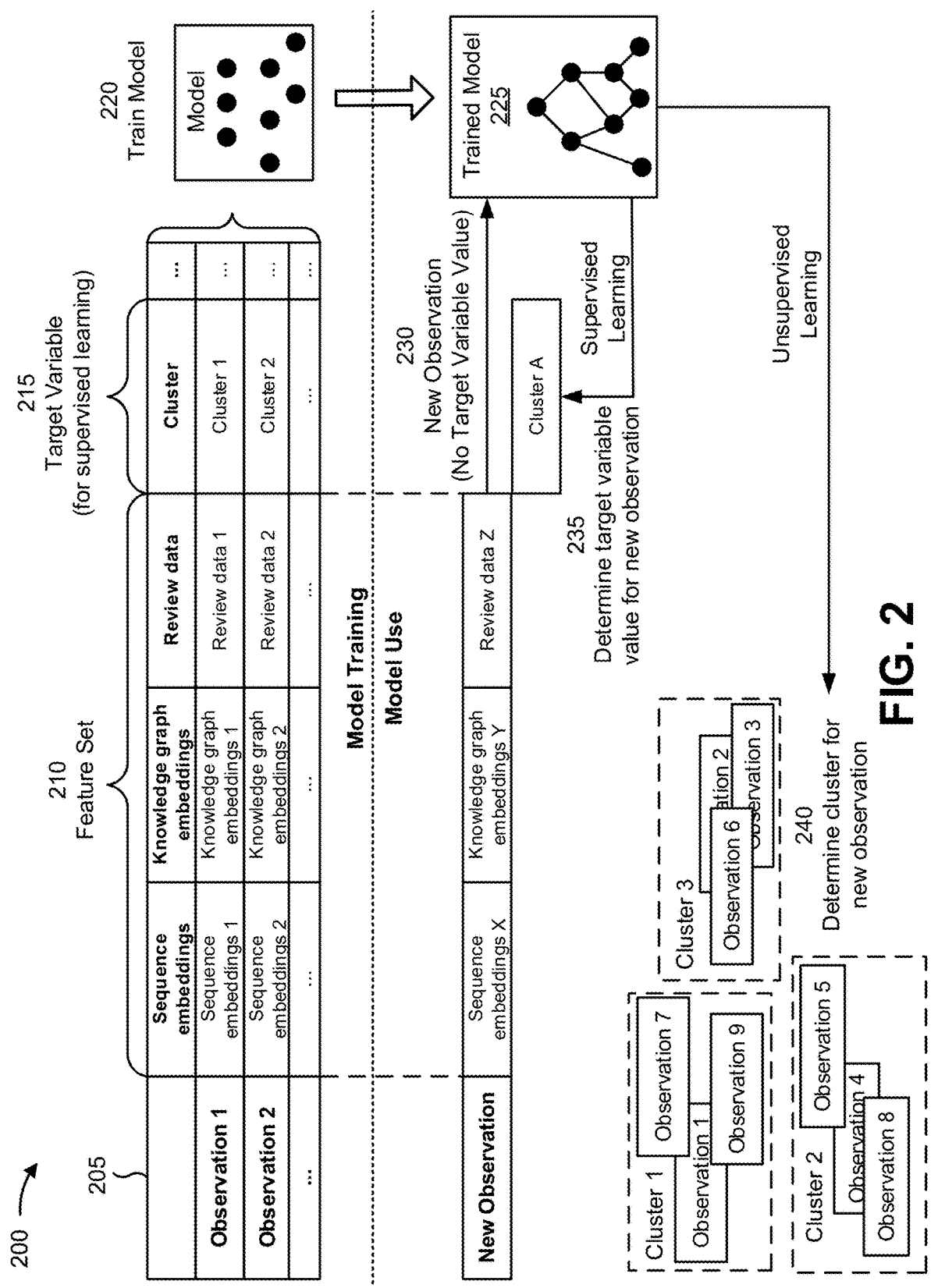
FIG. 2 is a diagram illustrating an example of training and using a machine learning model in connection with data-driven customer segmentation.

FIG. 2 is a diagram illustrating an example 200 of training and using a machine learning model in connection with data-driven customer segmentation. The machine learning model training and usage described herein may be performed using a machine learning system. The machine learning system may include or may be included in a computing device, a server, a cloud computing environment, and/or the like, such as the clustering system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the clustering system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the clustering system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of sequence embeddings, a second feature of knowledge graph embeddings, a third feature of review data, and so on. As shown, for a first observation, the first feature may have a value of sequence embeddings 1, the second feature may have a value of knowledge graph embeddings 1, the third feature may have a value of review data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is a cluster, which has a value of cluster 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of sequence embeddings X, a second feature of knowledge graph embeddings Y, a third feature of review data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict cluster A for the target variable of the cluster for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a sequence embeddings cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a knowledge graph embeddings cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process for data-driven customer segmentation. The machine learning system enables recognition and/or identification of tens, hundreds, thousands, or millions of features and/or feature values for tens, hundreds, thousands, or millions of observations, thereby increasing accuracy and consistency and reducing delay associated with data-driven customer segmentation relative to requiring computing resources to be allocated for tens, hundreds, or thousands of operators to manually providing data-driven customer segmentation.

As indicated above, FIG. 2 is provided as an example. Other examples may differ from what is described in connection with FIG. 2.

Figure 3:
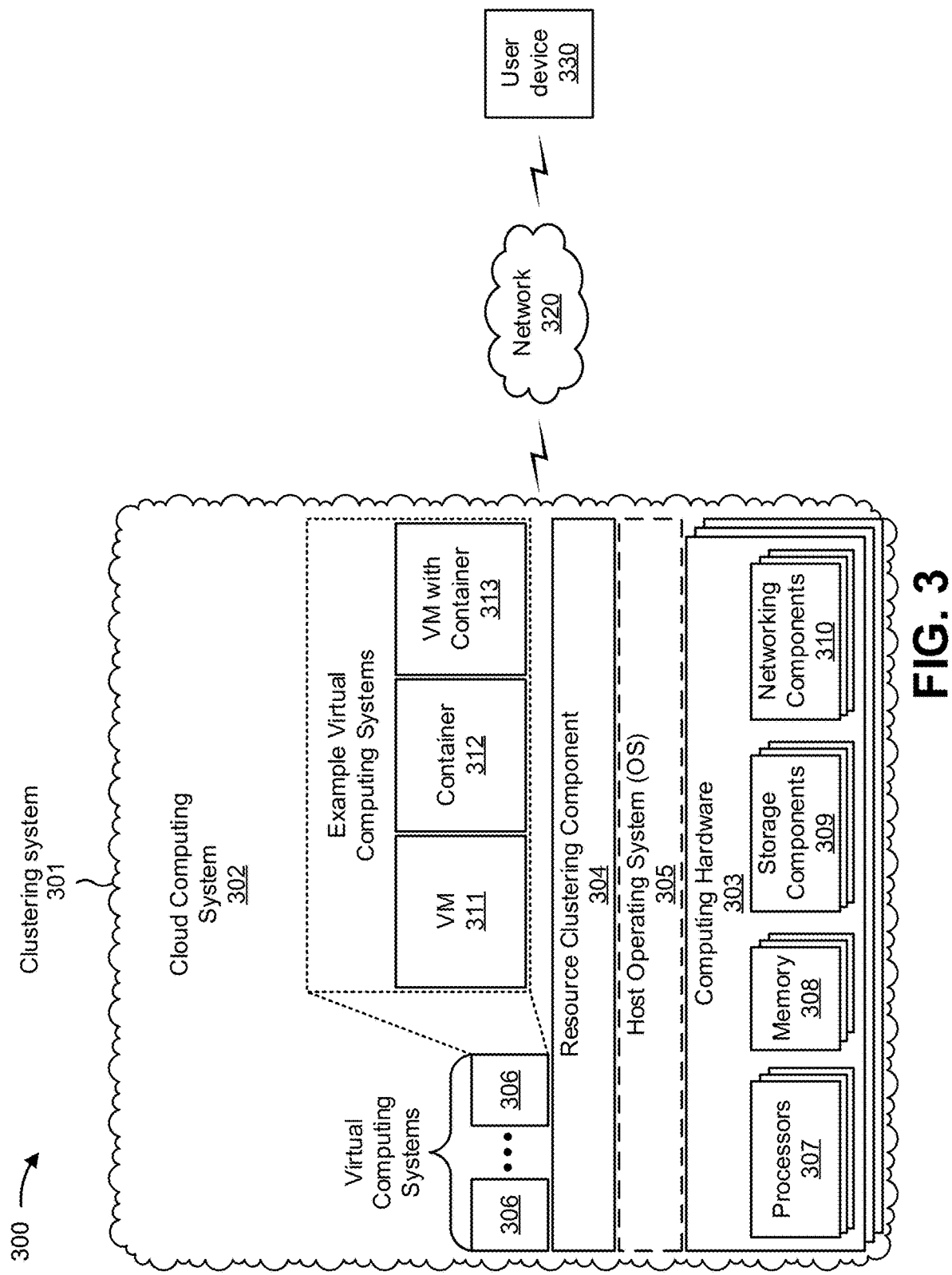
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a clustering system 301, which may include one or more elements of and/or may execute within a cloud computing system 302. The cloud computing system 302 may include one or more elements 303-313, as described in more detail below. As further shown in FIG. 3, the environment 300 may include a network 320 and/or a user device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the clustering system 301 may include one or more elements 303-313 of the cloud computing system 302, may execute within the cloud computing system 302, and/or may be hosted within the cloud computing system 302, in some implementations, the clustering system 301 may not be cloud-based (e.g., may be implemented outside of a cloud computing system) or may be partially cloud-based. For example, the clustering system 301 may include one or more devices that are not part of the cloud computing system 302, such as device 400 of FIG. 4, which may include a stand-alone server or another type of computing device. The clustering system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The user device 330 includes one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
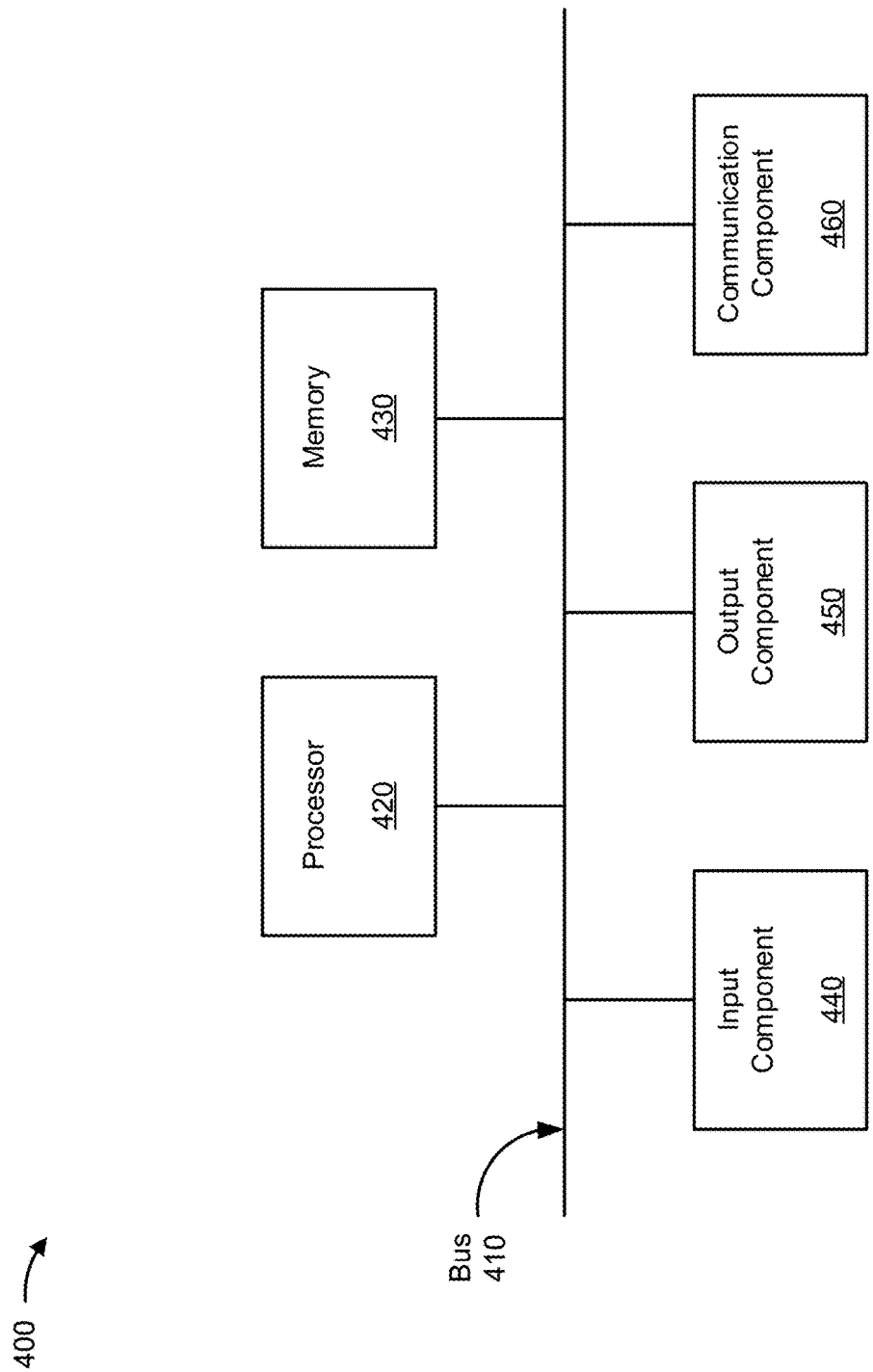
FIG. 4 is a diagram of example components of one or more devices of FIG. 3.

FIG. 4 is a diagram of example components of a device 400, which may correspond to the clustering system 301 and/or the user device 330. In some implementations, the clustering system 301 and/or the user device 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
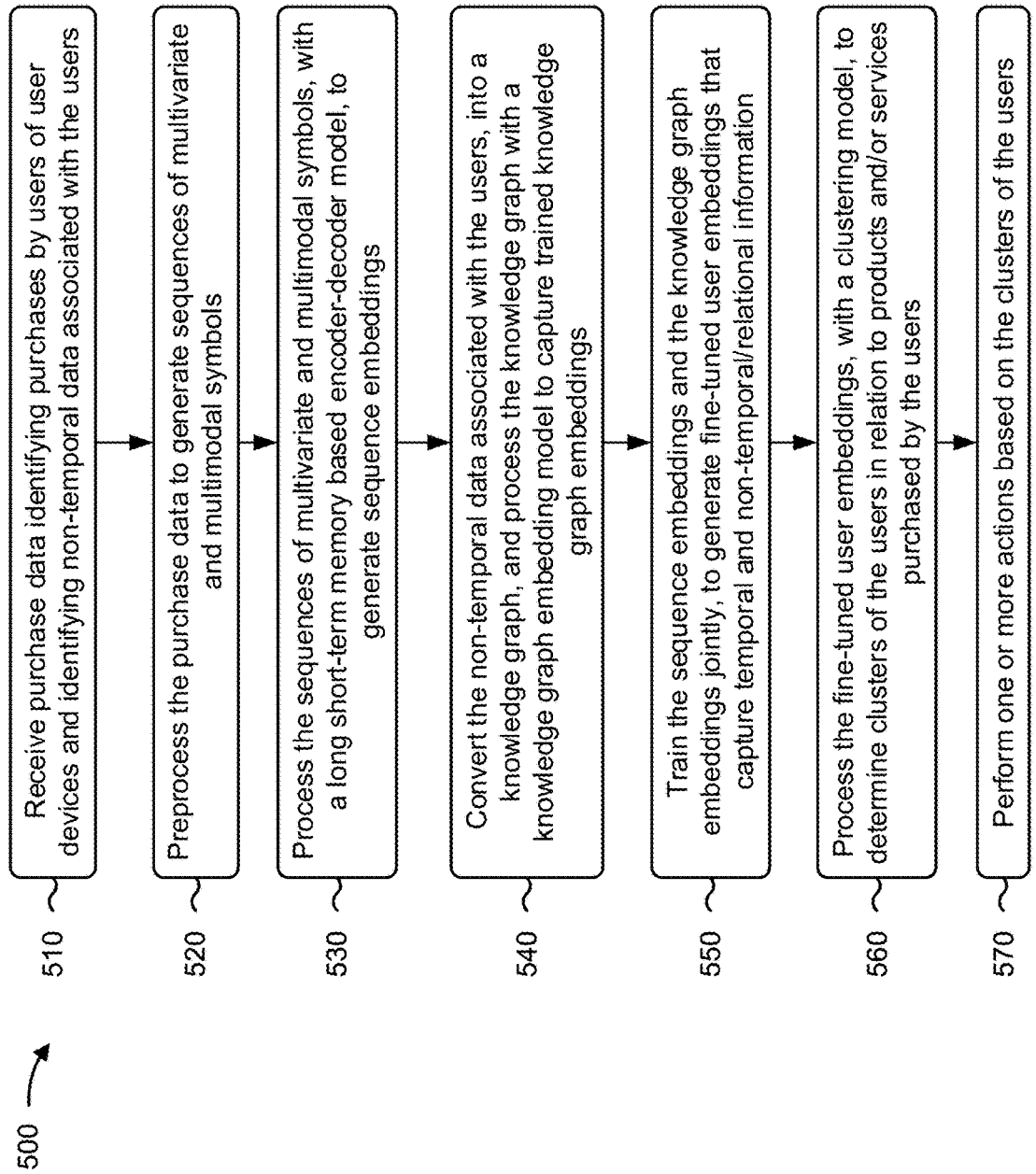
FIG. 5 is a flowchart of an example process for utilizing machine learning models for data-driven customer segmentation.

FIG. 5 is a flowchart of an example process 500 for utilizing machine learning models for data-driven customer segmentation. In some implementations, one or more process blocks of FIG. 5 may be performed by a device (e.g., the clustering system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving purchase data identifying purchases by users of user devices and identifying non-temporal data associated with the users (block 510). For example, the device may receive purchase data identifying purchases by users of user devices and identifying non-temporal data associated with the users, as described above. In some implementations, the non-temporal data includes data identifying one or more of friendships associated with the users, places of birth of the users, or genders of the users.

As further shown in FIG. 5, process 500 may include preprocessing the purchase data to generate sequences of multivariate and multimodal symbols (block 520). For example, the device may preprocess the purchase data to generate sequences of multivariate and multimodal symbols, as described above. In some implementations, the sequences of multivariate and multimodal symbols include temporal data associated with the users.

As further shown in FIG. 5, process 500 may include processing the sequences of multivariate and multimodal symbols, with a long short-term memory based encoder-decoder model, to generate sequence embeddings (block 530). For example, the device may process the sequences of multivariate and multimodal symbols, with a long short-term memory based encoder-decoder model, to generate sequence embeddings, as described above.

As further shown in FIG. 5, process 500 may include converting the non-temporal data associated with the users, into a knowledge graph, and process the knowledge graph with a knowledge graph embedding model to capture trained knowledge graph embeddings (block 540). For example, the device may convert the non-temporal data associated with the users, into a knowledge graph, and process the knowledge graph with a knowledge graph embedding model to capture trained knowledge graph embeddings, as described above. In some implementations, processing the non-temporal data associated with the users, with a knowledge graph, to determine knowledge graph embeddings capturing the non-temporal data associated with the users includes processing the knowledge graph, with the knowledge graph embedding model, to determine the knowledge graph embeddings capturing the non-temporal data associated with the users.

As further shown in FIG. 5, process 500 may include training the sequence embeddings and the knowledge graph embeddings jointly, to generate fine-tuned user embeddings that capture temporal and non-temporal/relational information (block 550). For example, the device may train the sequence embeddings and the knowledge graph embeddings jointly, to generate fine-tuned user embeddings that capture temporal and non-temporal/relational information, as described above. In some implementations, processing the sequences of multivariate and multimodal symbols, with the long short-term memory based encoder-decoder model, to generate the sequence embeddings includes initializing hidden vectors of the long short-term memory based encoder-decoder model using the knowledge graph embeddings, and updating the hidden vectors with temporal data associated with the users and to generate the sequence embeddings.

As further shown in FIG. 5, process 500 may include processing the fine-tuned user embeddings, with a clustering model, to determine clusters of the users in relation to products and/or services purchased by the users (block 560). For example, the device may process the fine-tuned user embeddings, with a clustering model, to determine clusters of the users in relation to products and/or services purchased by the users, as described above. In some implementations, the clustering model includes one or more of a k-means clustering model, an agglomerative model, or a density-based spatial clustering of applications with noise model.

As further shown in FIG. 5, process 500 may include performing one or more actions based on the clusters of the users (block 570). For example, the device may perform one or more actions based on the clusters of the users, as described above. In some implementations, performing the one or more actions based on the clusters of the users includes generating a marketing campaign for users in one of the clusters, and causing the marketing campaign to be implemented for the users in the one of the clusters. In some implementations, performing the one or more actions based on the clusters of the users includes generating, for users in one of the clusters, an advertisement associated with one of the products or one of the services, and causing the advertisement to be provided to the users in the one of the clusters. In some implementations, performing the one or more actions based on the clusters of the users includes modifying one of the products or one of the services based on one or more of the clusters, and causing the modified one of the products or the modified one of the services to be offered for sale.

In some implementations, process 500 includes training, jointly, the long short-term memory based encoder-decoder model and the knowledge graph embedding model. In some implementations, training, jointly, the long short-term memory based encoder-decoder model and the knowledge graph embedding model includes training the knowledge graph embedding model, with user embeddings extracted from the long short-term memory based encoder-decoder model, to capture non-temporal information, and training the long short-term memory based encoder-decoder model, with user embeddings extracted from the knowledge graph embedding model, to capture temporal information. In some implementations, training, jointly, the long short-term memory based encoder-decoder model and the knowledge graph embedding model includes training the knowledge graph embedding model, with historical temporal data, to generate historical knowledge graph embeddings, and training the long short-term memory based encoder-decoder model, with the historical knowledge graph embeddings, to generate historical sequence embeddings.

In some implementations, process 500 includes optimizing knowledge graph embedding weights of the knowledge graph embedding model, prior to receiving the purchase data; extracting historical knowledge graph embeddings based on optimizing the knowledge graph embedding weights of the knowledge graph embedding model; initializing a hidden vector of the long short-term memory based encoder-decoder model using the historical knowledge graph embeddings; optimizing autoencoder weights of the long short-term memory based encoder-decoder model; and updating the historical knowledge graph embeddings based on the autoencoder weights and to generate trained knowledge graph embeddings.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method utilizing machine learning models for data segmentation in an industry, comprising:
 receiving, by a device, user data identifying purchases by users of user devices and identifying non-temporal data associated with the users;

preprocessing, by the device, the user data to generate sequences of multivariate and multimodal symbols;

processing, by the device, the sequences of multivariate and multimodal symbols, with a long short-term memory based encoder-decoder model, to generate sequence embeddings,
 wherein the sequence embeddings are a transformation of the sequences into embeddings of fixed length,
 wherein the embeddings of the fixed length are an internal representation of concepts within a neural network and include vectors of numbers that are learned by the neural network from input data during a training stage, and
 wherein the sequence embeddings are generated based on initializing hidden vectors of the long short-term memory based encoder-decoder model and updating the hidden vectors with the sequences of multivariate and multimodal symbols;

converting, by the device, the non-temporal data associated with the users, to a knowledge graph, to determine knowledge graph embeddings capturing the non-temporal data associated with the users,
 wherein the knowledge graph embeddings represent the non-temporal data in a continuous vector space to predict missing links between nodes of the knowledge graph;

training, by the device, the sequence embeddings and the knowledge graph embeddings jointly, to generate modified sequence embeddings that capture both temporal data and the non-temporal data;
 processing, by the device, the sequence embeddings and the knowledge graph embeddings, with a knowledge graph embedding model;

generating, by the device and based on processing the sequence embeddings and the knowledge graph embeddings with the knowledge graph embedding model, the modified sequence embeddings, wherein the knowledge graph embedding model modifies the sequence embeddings by processing output data provided by the knowledge graph embeddings;

processing, by the device, the modified sequence embeddings, with a clustering model, to determine clusters of the users in relation to products or services purchased by the users; and performing, by the device and based on the clusters of the users, one or more actions comprising at least one of:
 retraining at least one of the long short-term memory based encoder-decoder model, the knowledge graph embedding model, or the clustering model based on the determined clusters of the users,
 modifying at least one of the products or the services based on the determined clusters, or
 generating and providing marketing data for the products or the services to user devices associated with the clusters of the users.

2. The method of claim 1, wherein the non-temporal data includes data identifying one or more of:
 friendships associated with the users,
 places of birth of the users, or
 genders of the users.

3. The method of claim 1, further comprising:
 training, jointly, the long short-term memory based encoder-decoder model and the knowledge graph embedding model.

4. The method of claim 3, wherein training, jointly, the long short-term memory based encoder-decoder model and the knowledge graph embedding model comprises:
 training the knowledge graph embedding model, with user embeddings extracted from the long short-term memory based encoder-decoder model, to capture non-temporal information; and
 training the long short-term memory based encoder-decoder model, with user embeddings extracted from the knowledge graph embedding model, to capture temporal information.

5. The method of claim 1, wherein the clustering model includes one or more of:
 a k-means clustering model,
 an agglomerative model, or
 a density-based spatial clustering of applications with noise model.

6. The method of claim 1, further comprising:
 optimizing knowledge graph embedding weights of the knowledge graph embedding model, prior to receiving the user data;
 extracting user embeddings from the knowledge graph embeddings based on optimizing the knowledge graph embedding weights of the knowledge graph embedding model;
 initializing a hidden vector of the long short-term memory based encoder-decoder model using the user embeddings extracted from the knowledge graph embeddings;
 optimizing autoencoder weights of the long short-term memory based encoder-decoder model; and
 updating the user embeddings extracted from the knowledge graph embeddings based on the autoencoder weights and to generate fine-tuned knowledge graph embeddings.

7. The method of claim 1, wherein the sequences of multivariate and multimodal symbols include temporal data associated with the users.

8. A device for utilizing machine learning models for data segmentation in an industry, comprising:
 one or more memories; and
 one or more processors, coupled to the one or more memories, configured to:
  train, jointly, a long short-term memory based encoder-decoder model and a knowledge graph embedding model;
  receive user data identifying purchases by users of user devices and identifying non-temporal data associated with the users;
  preprocess the user data to generate sequences of multivariate and multimodal symbols;
  process the sequences of multivariate and multimodal symbols, with the long short-term memory based encoder-decoder model, to generate sequence embeddings,
   wherein the sequence embeddings are a transformation of the sequences into embeddings of fixed length,
   wherein the embeddings of the fixed length are an internal representation of concepts within a neural network and include vectors of numbers that are learned by the neural network from input data during a training stage, and
   wherein the sequence embeddings are generated based on initializing hidden vectors of the long short-term memory based encoder-decoder model and updating the hidden vectors with the sequences of multivariate and multimodal symbols;

convert the non-temporal data associated with the users, to a knowledge graph, to determine knowledge graph embeddings capturing the non-temporal data associated with the users,
wherein the knowledge graph embeddings represent the non-temporal data in a continuous vector space to predict missing links between nodes of the knowledge graph;
train the sequence embeddings and the knowledge graph embeddings jointly, to generate fine-tuned embeddings that capture both temporal data and the non-temporal data;
process the sequence embeddings and the knowledge graph embeddings, with the knowledge graph embedding model;
generate, based on processing the sequence embeddings and the knowledge graph embeddings with the knowledge graph embedding model, the fine-tuned embeddings, wherein the knowledge graph embedding model modifies the sequence embeddings by processing output data provided by the knowledge graph embeddings;
process the fine-tuned embeddings, with a clustering model, to determine clusters of the users in relation to products or services purchased by the users; and
perform, based on the clusters of the users, one or more actions comprising at least one of:
retraining at least one of the long short-term memory based encoder-decoder model, the knowledge graph embedding model, or the clustering model based on the determined clusters of the users,
modifying at least one of the products or the services based on the determined clusters, or
generating and providing marketing data for the products or the services to users devices associated with the clusters of the users.

9. The device of claim 8, wherein the clustering model includes one or more of:
a k-means clustering model,
an agglomerative model, or
a density-based spatial clustering of applications with noise model.

10. The device of claim 8, wherein the one or more processors, to process the sequences of multivariate and multimodal symbols, with the long short-term memory based encoder-decoder model, to generate the sequence embeddings, are configured to:
initialize hidden vectors of the long short-term memory based encoder-decoder model using the knowledge graph embeddings; and
update the hidden vectors with temporal data associated with the users and to generate the sequence embeddings.

11. The device of claim 8, wherein the one or more processors, to process the non-temporal data associated with the users, with the knowledge graph, to determine the knowledge graph embeddings capturing the non-temporal data associated with the users, are configured to:
process the knowledge graph, with the knowledge graph embedding model, to determine the knowledge graph embeddings capturing the non-temporal data associated with the users.

12. The device of claim 8, wherein the one or more processors, to perform the one or more actions based on the clusters of the users, are configured to:
generate a marketing campaign for users in one of the clusters; and
cause the marketing campaign to be implemented for the users in the one of the clusters.

13. The device of claim 8, wherein the one or more processors, to perform the one or more actions based on the clusters of the users, are configured to:
generate, for users in one of the clusters, an advertisement associated with one of the products or one of the services; and
cause the advertisement to be provided to the users in the one of the clusters.

14. The device of claim 8, wherein the one or more processors, to perform the one or more actions based on the clusters of the users, are configured to:
modify one of the products or one of the services based on one or more of the clusters; and
cause the modified one of the products or the modified one of the services to be offered for sale.

15. A non-transitory computer-readable medium storing a set of instructions for utilizing machine learning models for data segmentation in an industry, the set of instructions comprising:
one or more instructions that, when executed by one or more processors of a device, cause the device to:
receive user data identifying purchases by users of user devices and identifying non-temporal data associated with the users;
preprocess the user data to generate temporal data associated with the users; process the temporal data associated with the users, with a long short-term memory based encoder-decoder model, to generate sequence embeddings,
wherein the sequence embeddings are a transformation of the sequences into embeddings of embeddings,
wherein the embeddings of the fixed length are an internal representation of concepts within a neural network and include vectors of numbers that are learned by the neural network from input data during a training stage, and
wherein the sequence embeddings are generated based on initializing hidden vectors of the long short-term memory based encoder-decoder model and updating the hidden vectors with the sequences of multivariate and multimodal symbols;
convert the non-temporal data associated with the users, to a knowledge graph, to determine knowledge graph embeddings capturing the non-temporal data associated with the users,
wherein the knowledge graph embeddings represent the non-temporal data in a continuous vector space to predict missing links between nodes of the knowledge graph;
train the sequence embeddings and the knowledge graph embeddings jointly, to generate fine-tuned user embeddings that capture both temporal data and the non temporal data;
process the sequence embeddings and the knowledge graph embeddings, with a knowledge graph embedding model;
generate, based on processing the sequence embeddings and the knowledge graph embeddings with the knowledge graph embedding model, the fine-tuned user embeddings, wherein the knowledge graph embedding model modifies the sequence embeddings by processing output data provided by the knowledge graph embeddings;

process the fine-tuned user embeddings, with a clustering model, to determine clusters of the users in relation to products or services purchased by the users; and perform, based on the clusters of the users, one or more actions comprising at least one of:
  retraining at least one of the long short-term memory based encoder-decoder model, the knowledge graph embedding model, or the clustering model based on the determined clusters of the users,
  modifying at least one of the products or the services based on the determined clusters, or
  generating and providing marketing data for the products or the services to user devices associated with the clusters of the users.

16. The non-transitory computer-readable medium of claim 15, wherein the one or more instructions further cause the device to:
  train the knowledge graph embedding model, with user embeddings extracted from the long short-term memory based encoder-decoder model, to capture non-temporal information; and train the long short-term memory based encoder-decoder model, with user embeddings extracted from the knowledge graph embedding model, to capture temporal information.

17. The non-transitory computer-readable medium of claim 15, wherein the temporal data associated with the users includes sequences of multivariate and multimodal symbols.

18. The non-transitory computer-readable medium of claim 15, wherein the one or more instructions further cause the device to:
  optimize knowledge graph embedding weights of the knowledge graph embedding model, prior to receiving the user data;
  extract user embeddings from the knowledge graph embeddings based on optimizing the knowledge graph embedding weights of the knowledge graph embedding model;
  initialize a hidden vector of the long short-term memory based encoder-decoder model using the user embeddings extracted from the knowledge graph embeddings;
  optimize autoencoder weights of the long short-term memory based encoder-decoder model; and
  update the user embeddings extracted from the knowledge graph embeddings based on the autoencoder weights and to generate fine-tuned knowledge graph embeddings.

19. The non-transitory computer-readable medium of claim 15, wherein the one or more instructions, that cause the device to process the temporal data associated with the users, with the long short-term memory based encoder-decoder model, to generate the sequence embeddings, cause the device to:
  initialize hidden vectors of the long short-term memory based encoder-decoder model using the knowledge graph embeddings; and
  update the hidden vectors with the temporal data associated with the users and to generate the sequence embeddings.

20. The non-transitory computer-readable medium of claim 15, wherein the one or more instructions, that cause the device to determine, based on the knowledge graph, the knowledge graph embeddings capturing the non-temporal data associated with the users, cause the device to:
  process the knowledge graph, with the knowledge graph embedding model, to determine the knowledge graph embeddings capturing the non-temporal data associated with the users.

* * * * *